United States Patent
Yen

(10) Patent No.: US 7,436,747 B2
(45) Date of Patent: Oct. 14, 2008

(54) DETECTOR AND METHOD FOR DETECTING SYNCHRONIZATION SIGNALS IN DISC SYSTEM

(75) Inventor: Kuang-Yu Yen, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 600 days.

(21) Appl. No.: 10/908,823

(22) Filed: May 27, 2005

(65) Prior Publication Data

US 2005/0265198 A1 Dec. 1, 2005

(30) Foreign Application Priority Data

May 31, 2004 (TW) .............. 93115489 A

(51) Int. Cl.
*G11B 7/00* (2006.01)
(52) U.S. Cl. .............. 369/59.19; 369/47.48
(58) Field of Classification Search .............. 369/59.19, 369/47.48
See application file for complete search history.

(56) References Cited

U.S. PATENT DOCUMENTS

| | | | |
|---|---|---|---|
| 4,747,116 A | 5/1988 | Yajima | |
| 6,084,731 A | 7/2000 | Uchida | |
| 6,496,555 B1 * | 12/2002 | Soda | ............ 375/376 |
| 6,532,128 B1 | 3/2003 | Bui | |
| 6,536,011 B1 | 3/2003 | Jang | |
| 6,697,383 B1 | 2/2004 | Li | |
| 6,895,062 B1 * | 5/2005 | Wilson | ............ 375/355 |
| 7,193,940 B2 | 3/2007 | Chen | |
| 2003/0002419 A1 * | 1/2003 | Kuma et al. | ............ 369/59.22 |
| 2004/0258185 A1 * | 12/2004 | Kihara | ............ 375/371 |
| 2005/0069041 A1 * | 3/2005 | Lincoln | ............ 375/257 |
| 2005/0141384 A1 * | 6/2005 | Lee et al. | ............ 369/59.19 |

FOREIGN PATENT DOCUMENTS

| | | |
|---|---|---|
| EP | 0902426 | 3/1999 |
| TW | 498206 | 8/2002 |
| TW | 561461 | 11/2003 |
| TW | 574786 | 2/2004 |
| WO | 9814936 | 4/1998 |

OTHER PUBLICATIONS

Naoe Hitoshi, Bit Synchronization circuit, Sep. 2001, JP 2001-036511 (English translation whole document).*

* cited by examiner

*Primary Examiner*—Wayne Young
*Assistant Examiner*—Van T Pham
(74) *Attorney, Agent, or Firm*—Winston Hsu

(57) ABSTRACT

A detector and a method for detecting synchronization signals in a disc system are disclosed. The method includes sampling a disc signal with a sampling clock to generate a plurality of sampled data, comparing the plurality of sampled data with a predetermined synchronization pattern to generate a comparison result, performing the above-mentioned comparing step after a predetermined time interval, and outputting a synchronization signal and adjusting the time for outputting the synchronization signal according to the comparison results.

16 Claims, 6 Drawing Sheets

DETECTOR AND METHOD FOR DETECTING SYNCHRONIZATION SIGNALS IN DISC SYSTEM

BACKGROUND OF THE INVENTION

1. Field of the Invention

The present invention relates to a detector and a method for detecting synchronization signal, and more specifically, to a detector and a method for detecting synchronization signals in a disc system.

2. Description of the Prior Art

In a communication system, a transmitter usually transmits a signal with a predetermined synchronization pattern (sync pattern) such that a receiver may receive the signal and decode the follow-up data including frames according to the synchronization pattern. Take a digital versatile disc (DVD disc) for example. The synchronization pattern utilized in a DVD disc is a signal composed of fourteen successive logical values "1". When a DVD player decodes a DVD signal, the DVD signal is compared to the synchronization pattern, so as to find out a disk synchronization pattern included in the DVD signal. Afterwards, the data of the DVD signal behind the disk synchronization pattern are decoded.

SUMMARY OF THE INVENTION

It is therefore an objective of the claimed invention to provide a detector and a method for detecting synchronization signals in a disc system.

According to the claimed invention, a detector is disclosed for detecting synchronization signals in a disc system. The detector includes: a sampling module utilized for sampling a disc signal with a sampling clock and generating a plurality of sampled data; a comparing module electrically coupled to the sampling module for comparing the plurality of sampled data with a predetermined synchronization pattern and thereby generating a comparison result, the comparing module repeating the above-mentioned comparing operation after a predetermined time interval; and an adjusting module electrically coupled to the comparing module for outputting a synchronization signal and adjusting the time for outputting the synchronization signal according to the comparison results.

According to the claimed invention, a method is disclosed for detecting synchronization signals in a disc system. The method includes: sampling a disc signal with a sampling clock to generate a plurality of sampled data; comparing the plurality of sampled data with a predetermined synchronization pattern to generate a comparison result; repeating the above-mentioned comparing step after a predetermined time interval; and outputting a synchronization signal and adjusting the time for outputting the synchronization signal according to the comparison results.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
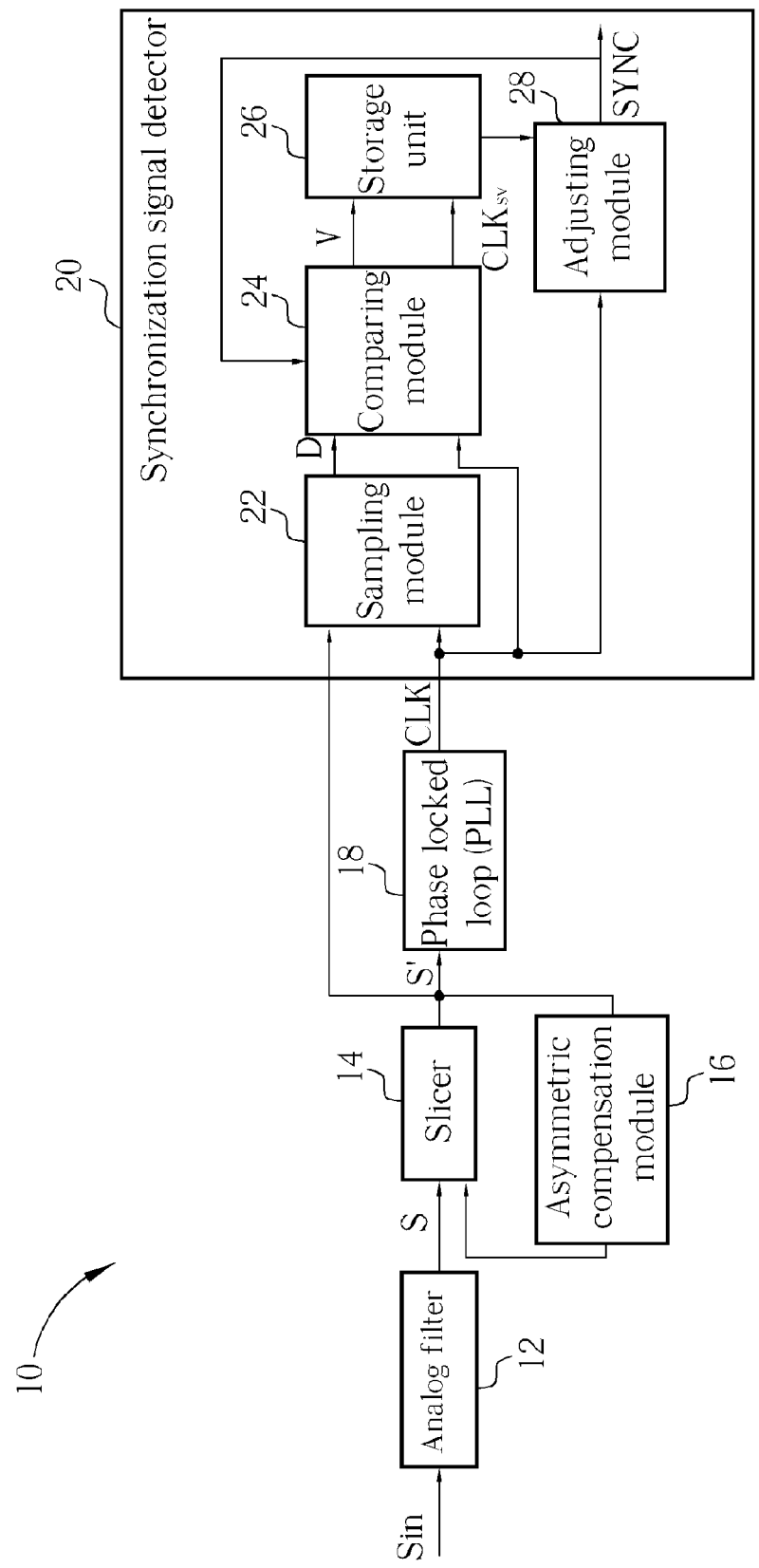
FIG. 1 is a functional block diagram of a synchronization signal detector utilized in a control circuit of an optical disc system according to the present invention.

Please refer to FIG. 1. FIG. 1 shows a block diagram of a synchronization signal detector 20 utilized in a control circuit 10 of an optical disc system according to the present invention. The synchronization signal detector 20 is installed in the control circuit 10 for detecting synchronization signals of an input signal Sin (e.g. Eight-to-Fourteen Modulation (EFM) data read from an optical disc). An analog filter 12 performs a filtering process on the input signal Sin to generate a filtered signal S. A slicer 14 converts the filtered signal S into a corresponding sliced signal S' according to a slice level. Besides, an asymmetric compensation module 16 is to provide feedback for the slicer 14 in order to eliminate the DC offset of the sliced signal S' through calibrating the slice level of the slicer 14. A phase locked loop (PLL) 18 generates a corresponding sampling clock CLK according to the sliced signal S'. In the present embodiment, the synchronization signal detector 20 comprises a sampling module 22, a comparing module 24, a storage unit 26 and an adjusting module 28.

Figure 2:
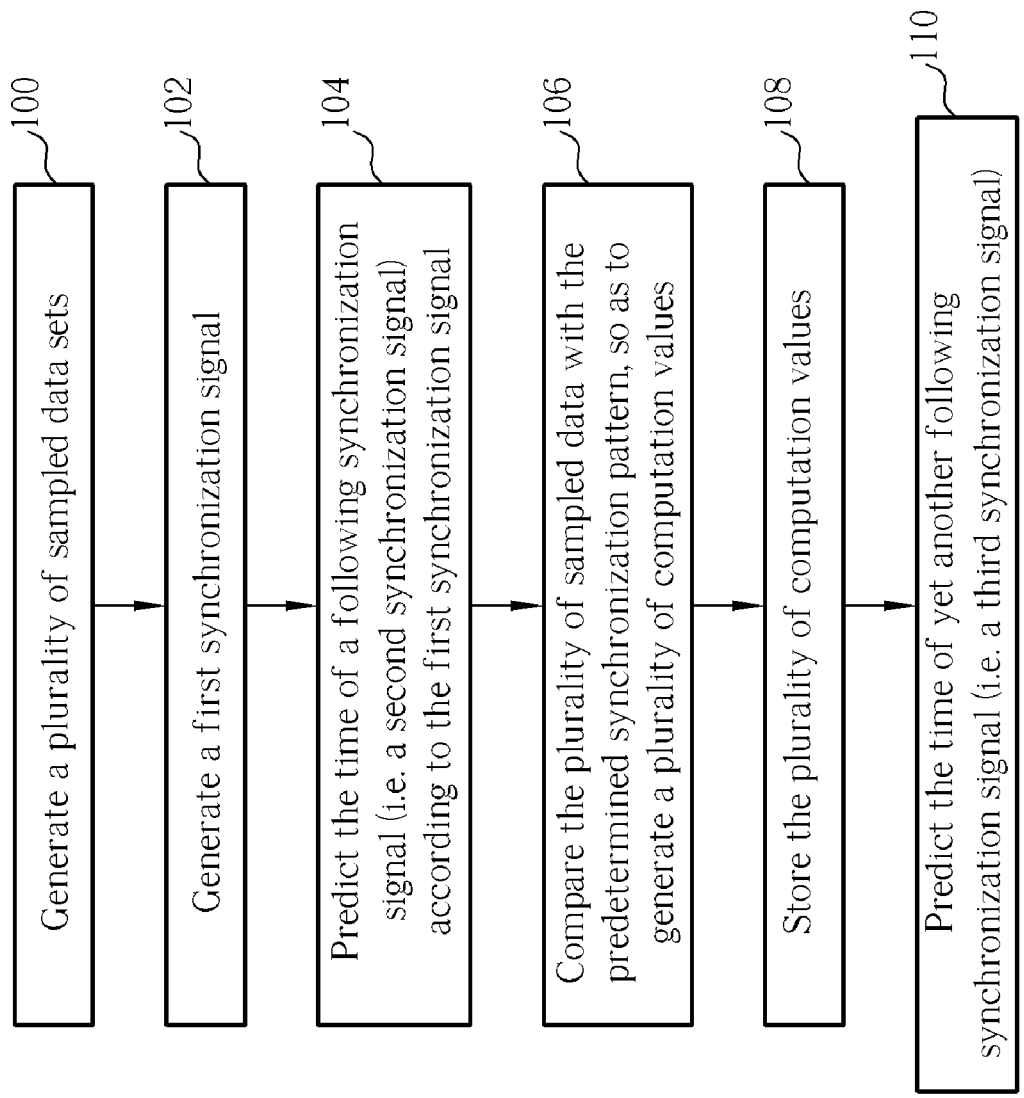
FIG. 2 is a flowchart illustrating a detecting method that can be performed by the synchronization signal detector of FIG. 1.

Please refer to FIG. 2. FIG. 2 is a flowchart illustrating a detecting method that can be performed by the synchronization signal detector 20 of FIG. 1. The method comprises the following steps, Step 100: Sample the sliced signal S' with the sampling module 22 according to the sampling clock CLK, so as to sequentially generate a plurality of sampled data D;

Step 102: Compare the plurality of sampled data D with a predetermined synchronization pattern by using the comparing module 24 and thus generate a first synchronization signal SYNC1;

Step 104: Predict the time of a following synchronization signal (i.e. a second synchronization signal SYNC2) with the comparing module 24 according to the first synchronization signal SYNC1;

Step 106: After a period of time, compare the plurality of sampled data generated during the period of time with the predetermined synchronization pattern by using the comparing module 24, so as to generate a plurality of computation values V, wherein the period of time is smaller than the time needed for generating the plurality of sampled data corresponding to a frame;

Step 108: Store the plurality of computation values V with the storage unit 26 according to a storing clock CLKsv; and Step 110: Predict the time of yet another following synchronization signal SYNC (i.e. a third synchronization signal SYNC3) by the adjusting module 28 according to the plurality of computation values V stored in the storage unit 26.

Figure 3:
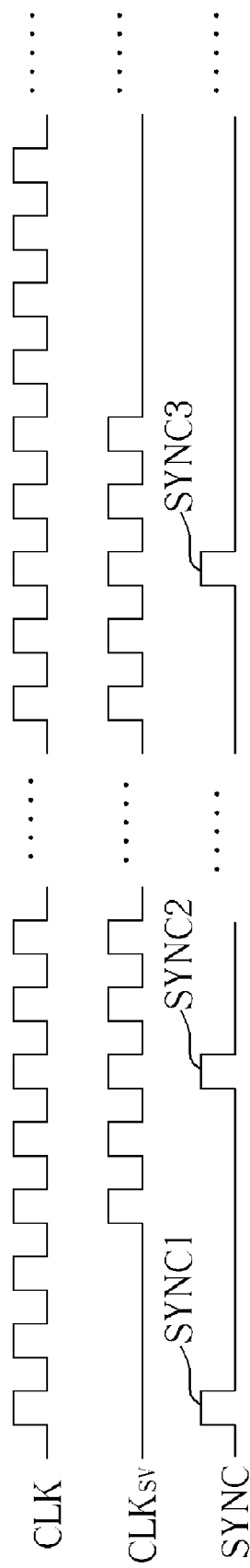
FIG. 3 is a timing diagram of the sampling clock CLK, the storing clock CLKsv and the synchronization signal SYNC of FIG. 1.

Please refer to FIG. 3. FIG. 3 is a timing diagram showing the sampling clock CLK, the storing clock CLKsv, and the synchronization signal SYNC of FIG. 1. The comparing module 24 compares the plurality of sampled data D with the predetermined synchronization pattern to generate a synchronization signal SYNC1, and predicts the time of the following synchronization signal SYNC2 according to the synchronization signal SYNC1. An embodiment of the present invention is to take a DVD system for example (i.e. the optical disc driver 10 representing a DVD driver). In this embodiment, there are 1488 clock cycles between two synchronization signals. Therefore, the time of the synchronization signal SYNC2 should be the time of the synchronization signal SYNC1 adding 1488 clock cycles of the sampling clock CLK. In the present embodiment, the comparing module 24 starts to compare the plurality of sampled data D with the predetermined synchronization pattern at a time earlier than the synchronization signal SYNC2 by two clock cycles and trigger the storing clock CLKsv. The storage unit 26 stores the computation value(s) V generated by the comparing module 24 according to the storing clock CLKsv. Hence, the comparing module 24 compares the plurality of sampled data D generated between two clock cycles before and behind the predetermined time of the synchronization signal SYNC2 with the predetermined synchronization signal, so as to respectively generate five computation values V. In the present embodiment, the computation values V are generated according to the correlation between the plurality of sampled data D and the predetermined synchronization pattern, such that the computation values V represent the similarity between the plurality of sampled data D and the predetermined synchronization pattern. The detailed operation is described as follows.

Figure 4:
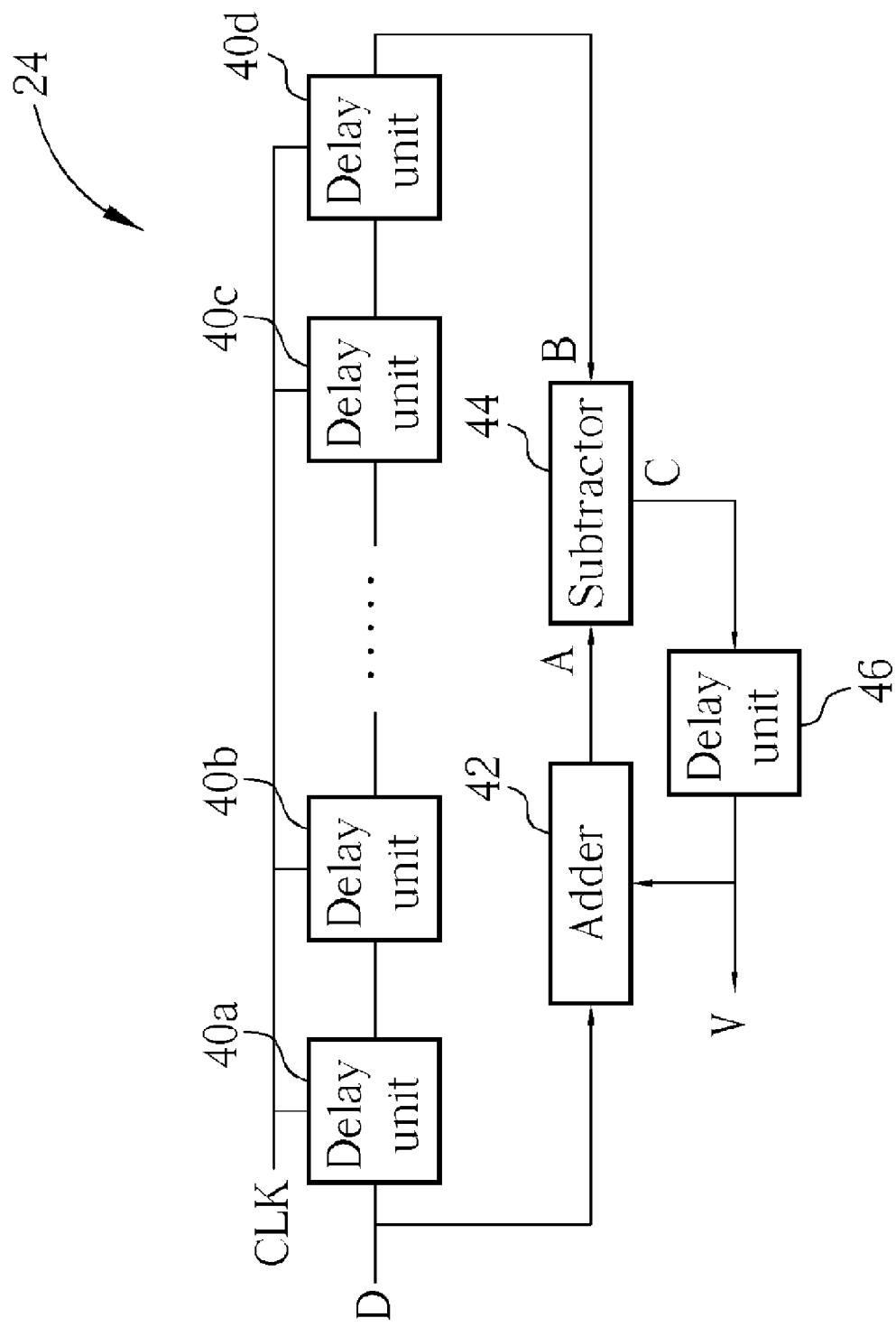
FIG. 4 is functional block diagram of an embodiment for implementing the comparing module shown in FIG. 1.

Please refer to FIG. 4. FIG. 4 shows an embodiment for implementing the comparing module 24 shown in FIG. 1. The comparing module 24 comprises a plurality of serially coupled delay units 40a, 40b, . . . , 40c, and 40d, an adder 42 coupled to the delay unit 40a, a subtractor 44 coupled between the delay unit 40d and the adder 52 and an output delay unit 46 coupled between the subtractor 44 and the adder 42. In the present embodiment, the input signal Sin is a signal that conforms to the DVD specification such that the synchronization pattern of a DVD signal comprises fourteen successive logical values "1". Therefore, the comparing module 24 uses fourteen serially coupled delay unit 40a, 40b, . . . , 40c, and 40d for storing the plurality of sampled data D. If the initial values stored in the delay units 40a, 40b, 40c, 40d and 46 are zero and a sampled data $D_1$ is received by the delay unit 40a and the adder 42, the delay unit 40a keeps the sampled data $D_1$ and the adder 42 outputs a data A which is also the sampled data $D_1$ while the output of the delay unit 46 is zero. Consequently, a data C outputted by the subtractor 44 are also the sampled data $D_1$. When the next sampled data $D_2$ is received by the delay unit 40a and the sampled data $D_1$ was transmitted from the delay unit 40a into the next delay unit 40b, the delay units 40a and 40b respectively keep the sampled data $D_2$ and $D_1$ at present. Furthermore, the sampled data $D_2$ is also received by the adder 42 and thus the data A outputted by the adder 42 is the sum of the sampled data $D_2$ and D1 while the output of the delay unit 46 is the data D1. Hence, the data C outputted by the subtractor 44 is the data A because the data B outputted by the delay unit 40d is still zero. Afterward, the delay unit 46 updates the previously recorded value according to the data C. Similarly, after the fourteen sampled data $D_1$-$D_{14}$ are sequentially received by the comparing module 24, the delay units 40a, 40b, . . . , 40c, and 40d shown in FIG. 4 respectively record the sampled data $D_{14}$-$D_1$. When the following sampled data $D_{15}$ is received by the delay unit 40a and the adder 42, the data A outputted by the adder 42 is the sum of the sampled data $D_1$-$D_{15}$ while the output of the delay unit 46 is the sum of the sampled data $D_1$-$D_{14}$, and the delay unit 40d outputs the data B (i.e. the sampled data $D_1$ at present) into the subtractor 44. Consequently, the subtractor 44 subtracts the data B from the data A and outputs the subtracted result data C, that is to say, the data $D_2$-$D_{15}$. Accordingly, the computation value V stored by the delay unit 46 is thereby updated according to the data C.

Figure 5:
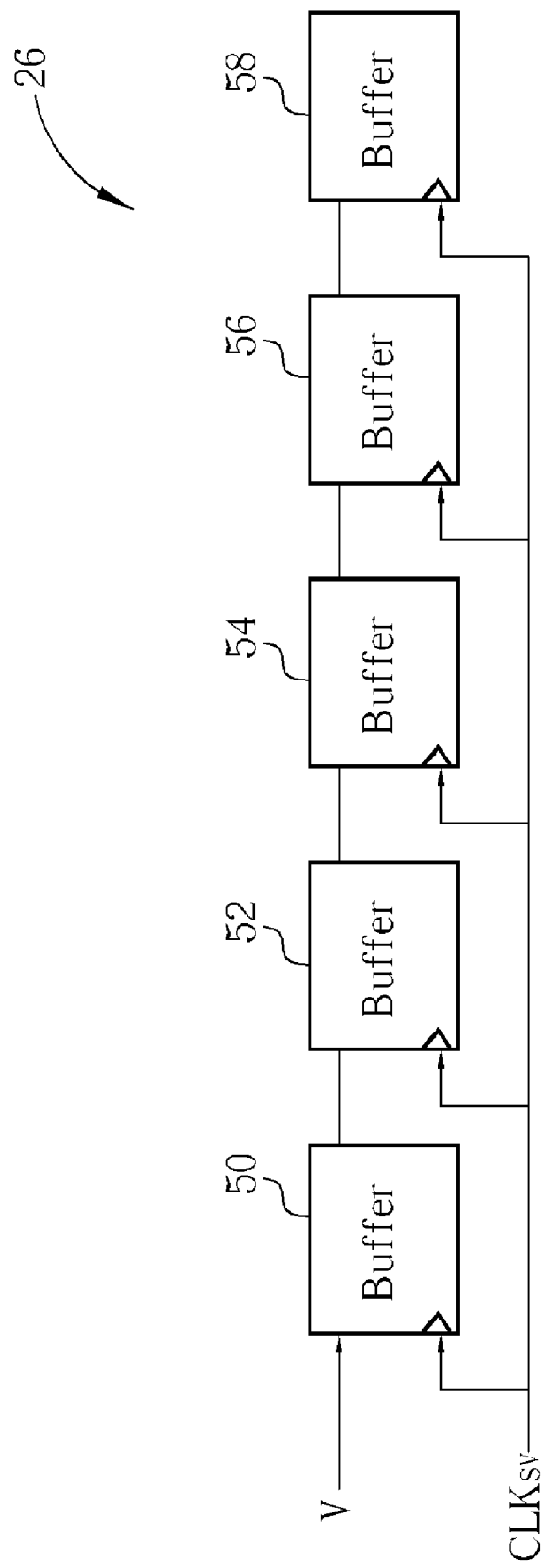
FIG. 5 is functional block diagram of an embodiment for implementing the storage unit of FIG. 1.
Figure 6:
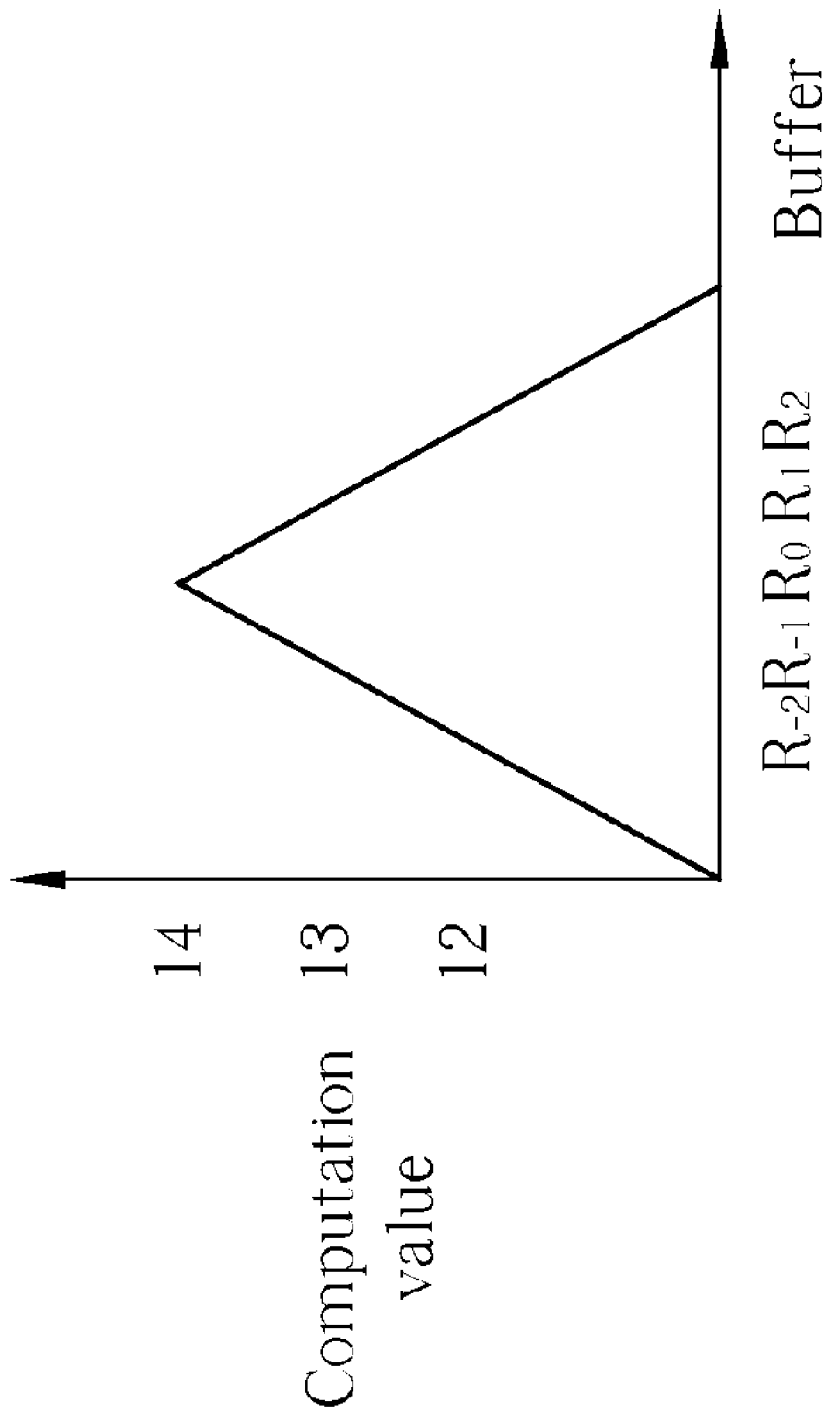
FIG. 6 is a diagram showing the relation between the buffers shown in FIG. 5 and the five computation values.

Please refer to FIG. 5. FIG. 5 shows an embodiment for implementing the storage unit 26 of FIG. 1. The storage unit 26 comprises a plurality of buffers 50, 52, 54, 56 and 58, which respectively store each of five computation values V according to a storing clock CLKsv. Please refer to FIG. 5 and FIG. 6. FIG. 6 shows the relation between the buffers 50, 52, 54, 56 and 58 and the five computation values. For convenience of description, an ideal condition is taken for example, and $R_{-2}$, $R_{-1}$, $R_0$, $R_1$ and $R_2$ of FIG. 6 respectively represent the buffers 50, 52, 54, 56 and 58 and the numbers shown in the vertical axle of FIG. 6 represent computation values V stored by the buffers 50, 52, 54, 56 and 58. In the ideal condition, the synchronization signal SYNC2 is composed of fourteen successive values "1" and the values of signals around the synchronization signal SYNC2 are both "0". Hence, the computation values V respectively outputted by the comparing module 24 vary with a predetermined manner according to the operation of the comparing module 24 described before. In other words, the computation values V recorded by the buffers 50, 52, 54, 56 and 58 appear a symmetric relation in accordance with the largest computation value 14. Accordingly, when the buffer 50 stores the computation value 12 at the time two sampling clock CLK cycles behind the predetermined time of the synchronization signal SYNC2, the buffers 52, 54, 56, and 58 respectively store the computation values 13, 14, 13, and 12. These computation values 13, 14, 13, and 12 are respectively generated by the comparing module 24 at the time one sampling clock CLK cycle behind the time of the signal SYNC2, the time of the signal SYNC2, one sampling clock CLK cycle before the time of the signal SYNC2, and two sampling clock CLK cycles before the time of the signal SYNC2.

In the present embodiment, the adjusting module 28 predicts and calibrates the time of the next synchronization signal SYNC3 according to the computation values V stored in the buffers 50, 52, 54, 56 and 58. If the time of the synchronization signal SYNC2 can be predicted precisely according to the synchronization signal SYNC1, the buffer 54 stores a maximum value, i.e. 14 in this embodiment. If the maximum value is not stored in the buffer 54, the offset between the buffer which records the maximum value and the buffer 54 can be used to get the current time offset of the synchronization signal SYNC2 and to further calibrate the predicted time of the next synchronization signal SYNC3. For example, if the maximum value is stored in the buffer 52, the time of the synchronization signal SYNC2 predicted in accordance with the synchronization signal SYNC1 is later than the correct time of the synchronization signal SYNC2 by a sampling clock CLK cycle. Consequently, the time of the synchronization signal SYNC3 predicted according to the time of the signal SYNC2 should be advanced by one sampling clock CLK cycle. On the other hand, if the maximum value is stored in the buffer 58, the time of the synchronization signal SYNC2 predicted according to the time of the synchronization signal SYNC1 is earlier than the correct time of the synchronization signal SYNC2 by two sampling clock cycles. Hence, the time of the synchronization signal SYNC3 predicted according to the time of the signal SYNC2 should be delayed by two sampling clock cycles. In the same manner, the adjusting module 28 can calibrate the predicted time of the following synchronization signal according to the computation values V respectively generated at the times around the predicted time of a current synchronization signal.

Because the computation values V are symmetric, the adjusting module 28 can calibrate the predicted time of the following synchronization signal according to the computation values V stored in the buffers 50, 52, 54, 56 and 58. In an ideal condition, the symmetric buffers 52 and 56 should store the same computation value. However, if the maximum computation value is stored in the buffer 56 and the computation value stored in the buffer 52 is 12, an offset bigger than 0 can be generated by subtracting the computation value stored in the buffer 52 from the computation value stored in the buffer 56, so as to indicate that the predicted time of the synchronization signal, SYNC2 for example, should be delayed to fit in with the correct time of the synchronization signal SYNC2. Therefore, the time of the synchronization signal SYNC3 predicted according to the signal SYNC2 has to be advanced or delayed according to the offset.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for detecting synchronization signals in a disc system, comprising:
    sampling a disc signal with a sampling clock to generate a plurality of sampled data;
    comparing the sampled data with a predetermined synchronization pattern to determine a time of a first synchronization pattern occurring in the sampled data;
    determining a time of a second synchronization pattern occurring in the sampled data according to a predetermined interval after the time of the first synchronization pattern;
    comparing the plurality of sampled data with the predetermined synchronization pattern within a range around the time of the second synchronization pattern to thereby generate a plurality of respective computation values;
    determining whether the time of the second synchronization pattern is correct according to the computation values; and
    predicting a time of a third synchronization pattern according to the predetermined interval when the time of the second synchronization pattern is correct, and according to an adjusted interval generated by the predetermined interval and the computation values when the time of the second synchronization pattern is incorrect.

2. The method of claim 1, wherein the predetermined synchronization pattern comprises fourteen successive logical values "1".

3. The method of claim 1 wherein the predetermined interval is substantially equal to the time needed for generating the sampled data corresponding to a frame.

4. The method of claim 1, wherein the predetermined time interval corresponds to 1488 cycles of the sampling clock.

5. The method of claim 3, wherein the adjusted interval is substantially equal to the time needed for generating the sampled data corresponding to the frame being adjusted by n sampling clock cycles, n being an integer associated with the computation values.

6. The method of claim 1, wherein the step of generating the computation values comprises calculating a computation value for each of the sampling clocks within the range around the time of the second synchronization pattern, each computation value representing a similarity between the sampled data and the predetermined synchronization pattern.

7. The method of claim 6, further comprising:
    determining an offset of a maximum computation value from a center position of the computation values, the maximum computation value corresponding to a highest similarity between the sampled data and the predetermined synchronization pattern, and the center position corresponding to a computation value calculated at a middle sampling clock of the range; and
    adjusting the predetermined interval to form the adjusted interval by a number of sampling clocks being equal to the offset.

8. The method of claim 1, wherein the disc is an optical disc.

9. A detector utilized in an optical storage device, comprising:
    a sampling module for sampling a disc signal with a sampling clock to generate a plurality of sampled data;
    a comparing module electrically coupled to the sampling module for comparing the sampled data with a predetermined synchronization pattern to determine a time of a first synchronization pattern occurring in the sampled data, determining a time of a second synchronization pattern occurring in the sampled data according to a predetermined interval after the time of the first synchronization pattern, and for comparing the plurality of sampled data with the predetermined synchronization pattern within a range around a time of a second synchronization pattern occurring in the sampled data to thereby generate a plurality of respective computation values; and
    an adjusting module electrically coupled to the comparing module for predicting a time of a third synchronization pattern according to the predetermined interval when the time of the second synchronization pattern is correct, and according to an adjusted interval generated by the predetermined interval and the computation values when the time of the second synchronization pattern is incorrect.

10. The detector of claim 9, wherein the predetermined synchronization pattern comprises fourteen successive logical values "1".

11. The detector of claim 9 wherein the predetermined interval is substantially equal to the time needed for generating the sampled data corresponding to a frame.

12. The detector of claim 9, wherein the predetermined time interval corresponds to 1488 cycles of the sampling clock.

13. The detector of claim 11, wherein the adjusted interval is substantially equal to the time needed for generating the sampled data corresponding to the frame being adjusted by n clock cycles, n being an integer associated with the computation values.

14. The detector of claim 9, wherein the comparing module is further for calculating a computation value for each of the sampling clocks within the range around the time of the second synchronization pattern, each computation value representing a similarity between the sampled data and the predetermined synchronization pattern.

15. The detector of claim 14, wherein the adjusting module is further for determining an offset of a maximum computation value from a center position of the computation values, the maximum computation value corresponding to a highest similarity between the sampled data and the predetermined synchronization pattern, and the center position corresponding to a computation value calculated at a middle sampling clock of the range; and for adjusting the predetermined interval to form the adjusted interval by a number of sampling clocks being equal to the offset.

16. The detector of claim 9, wherein the disc is an optical disc.

* * * * *